(12) United States Patent
Zino et al.

(10) Patent No.: US 7,042,998 B2
(45) Date of Patent: May 9, 2006

(54) CALL ROUTING SYSTEM AND METHOD WITH RULE-MODIFYING ABILITY

(75) Inventors: Galeal Zino, Plainsboro, NJ (US); Tom Evslin, Princeton, NJ (US); Brad Miller, Cranbury, NJ (US)

(73) Assignee: ITXC IP Holdings, S.A.R.L., Luxembourg ( * ) Notice: Subject to any disclaimer, the term of this patent is extended or adjusted under 35 U.S.C. 154(b) by 332 days.

(21) Appl. No.: 10/273,343

(22) Filed: Oct. 17, 2002

(65) Prior Publication Data

US 2004/0042606 A1    Mar. 4, 2004

Related U.S. Application Data

(63) Continuation-in-part of application No. 10/228,527, filed on Aug. 27, 2002.

(51) Int. Cl.
*H04M 7/00*    (2006.01)

(52) U.S. Cl. ............................ 379/220.01; 379/221.01; 379/272; 379/273

(58) Field of Classification Search ................ 370/352, 370/356, 467; 379/219, 220.01, 221.01, 379/272, 273, 900
See application file for complete search history.

(56) References Cited

U.S. PATENT DOCUMENTS

| | | | | |
|---|---|---|---|---|
| 5,406,620 A | * | 4/1995 | Pei | 379/221.02 |
| 5,793,859 A | * | 8/1998 | Matthews | 379/211.03 |
| 5,896,448 A | * | 4/1999 | Holt | 379/221.03 |
| 6,205,135 B1 | * | 3/2001 | Chinni et al. | 370/356 |
| 6,366,576 B1 | * | 4/2002 | Haga | 370/352 |
| 6,373,857 B1 | * | 4/2002 | Ma | 370/475 |
| 6,404,746 B1 | * | 6/2002 | Cave et al. | 370/262 |
| 6,584,110 B1 | * | 6/2003 | Mizuta et al. | 370/401 |
| 6,600,735 B1 | * | 7/2003 | Iwama et al. | 370/352 |
| 6,606,668 B1 | * | 8/2003 | MeLampy et al. | 709/241 |
| 6,791,970 B1 | * | 9/2004 | Ng et al. | 370/352 |

* cited by examiner

*Primary Examiner*—Bing Q. Bui
(74) *Attorney, Agent, or Firm*—Kaplan, Gilman Gibson & Dernier LLP

(57) ABSTRACT

A method and system is provided wherein routing information is obtained from previously cached information or from a gatekeeper. An originating gateway in a network receives a request for a connection and determines whether pertinent routing information is cached. If available, the cached routing is used to attempt to establish a connection. If no previously established routing is available, the originating gateway requests preferred routing from a gatekeeper, including prioritized selections of terminating gateways through which to make a connection to a designated call recipient. In a further embodiment of the invention, a process is provided to respond to a complaint regarding the quality of service. The system determines whether the reported problem is general or isolated; if it is general, alternate call routing is devised.

24 Claims, 3 Drawing Sheets

CALL ROUTING SYSTEM AND METHOD WITH RULE-MODIFYING ABILITY

RELATED APPLICATION

This application is a continuation-in-part of patent application Ser. No. 10/228,527, filed Aug. 27, 2002.

FIELD OF THE INVENTION

The present invention relates to the field of telephony, and more particularly, to a system and method for routing of calls through a data network based upon the application of a set of rules while minimizing unnecessary repetitive execution of those rules.

BACKGROUND OF THE INVENTION

The basic model for completing a telephone call is changing. Rather that rely completely on end to end circuit switched connections, more and more phone calls are completed using, at least in part, packet switching techniques. More systems and equipment are being developed that are dedicated to transmission of voice communication on the Internet. As more of these systems and equipment become available, the complexity of the communications matrix increases.

In IP telephony systems it is known to conduct a telephone call utilizing a combination of public switched telephone network (PSTN) links, and packet telephony links. An example of such a system is shown in U.S. Pat. No. 6,404,864 ("the '864 patent") owned by the assignee of the present invention. In such prior systems, an "originating gateway" takes the call from the PSTN to the Internet, and a "terminating gateway" places the call back onto the PSTN at a remote location after removing it from the Internet. Thus, a long distance call may have three "legs" a first PSTN leg from the calling telephone to the originating gateway, a second leg from the originating gateway to a terminating gateway, and a third leg from a terminating gateway to a called telephone.

The '864 patent is directed to a system that helps the originating gateway pick which of several terminating gateways that are located in the remote location should be selected to complete the call from the Internet, over a PSTN link, to a destination terminal. The '864 patent is incorporated herein in its entirety by reference.

Of course, not all terminating gateways are equal; some are more desirable than others on the basis of their speed, their cost economy, or their connection quality. Thus, to optimize the overall efficiency of the transmission operation, a system preferably should select a routing based on pre-established criteria, some of which are noted above.

Typically, there is a set of rules that gets executed in the system in order to ascertain the appropriate terminating gateway or other routing to use. These rules are executed for each call, and are often executed at an intelligent server that is remote from both the originating gateway and the terminating gateway. Therefore, there is additional communications overhead for the originating gateway to communicate with the intelligent server for each call. Often, the communications involves sending one or more parameters of the call (e.g. the called number) from the gateway to the intelligent node, executing some routing rules at the intelligent node, and returning a response that specifies one or more terminating gateways that can be used to complete the call. The terminating gateway takes the call from the Internet and completes it to a remote destination, usually using a PSTN link.

Of course, electronic equipment is subject to malfunction periodically. If a gateway experiences a breakdown or any malfunction, a call routed through this gateway will not be completed. It would be desirable to modify the established rules by which routing is set up involving any malfunctioning gateway in order to circumvent an inoperative route, thus the malfunctioning gateway is avoided. The present invention recognizes that implementation of corrective action through operator intervention will, of necessity, involve delays.

It is an object of the present invention to provide a system and method for call routing through a network while reducing the communications and processing overhead required for each call to be analyzed and for routing rules to execute and select a terminating gateway for each call.

It is a further object of the present invention to provide a system and method capable of modifying rules for routing a call to eliminate.

This and other objects of the invention disclosed will become more apparent from the description of the invention to follow.

SUMMARY OF THE INVENTION

The above and other problems of the prior art are overcome in accordance with the present invention that relates to a system for temporarily and locally storing, (i.e. caching) the outcome of routing rules for future use. In accordance with the invention, a gateway requesting routing information from an intelligent node will store at least the received information and parameter of the call upon which the routing information is based. Thus, the required routing information for a subsequent call having the same parameters is available locally, at the originating gateway. When a subsequent call arrives with similar parameters, the gateway may use the same routing result, rather than having to retransmit the parameters to the intelligent node. Thus, for subsequent calls, no additional communications overhead is incurred to contact the intelligent node, and no processing overhead is incurred in order to calculate the route.

In enhanced embodiments, the caching may be replaced periodically, or upon certain conditions such as timeout, or other occurrence whereby the intelligent node recognizes that the previous information it has sent for caching to gateways is outdated. Additionally, the caching may include the use of authentication information. Thus, calls are routed using routes calculated during a prior call if possible. If not possible, calls are routed using a route calculated for the call in question, but that route is then used for future calls with similar parameters.

A further embodiment of the invention disclosed herein provides a method and system for correcting routing after it has been determined that a particular gateway, or other network component, is not completing calls. An analysis is performed to determine the degree of problem based on an initial customer complaint. The system then revises the rules by which call routing is generated in order to correct a problem.

DETAILED DESCRIPTION OF THE INVENTION

Figure 1:
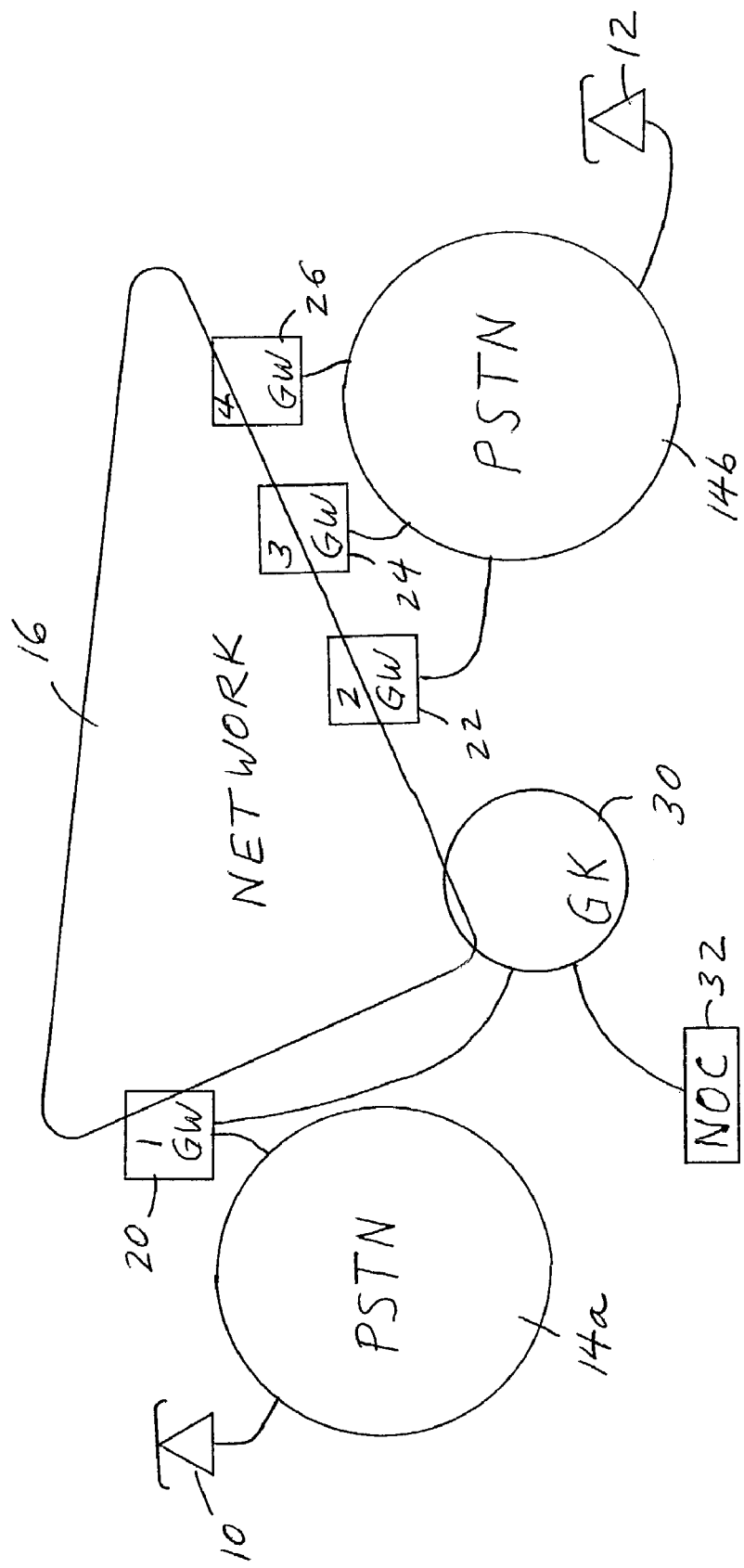
FIG. 1 is schematic diagram of a communication network in which various components are connectable to one another by way of a network.

The invention is described below in terms of a communications network as illustrated in FIG. 1 for use in implementing a voice communication session between a caller device 10 and a callee device 12. Caller device 10 may be a hard wired telephone that connects directly to PSTN 14a or a cell phone that connects to PSTN 14a through intermediate receptor towers and relay stations or a client computer. This can be very important since the routing lookup will be needed to support IP-enabled roaming. In this case, the device may connect directly to the GK and the cache would be on or near the device. Similarly, termination may be an IP endpoint independent of whether or not origination is]. PSTN 14a and PSTN 14b are represented to be local segments of the universal PSTN to which all telephone communications eventually connect. Whereas PSTN 14a is portrayed as being in the vicinity of caller device 10, for example in the New York area, PSTN 14b is portrayed as being in the vicinity of callee device 12 which may be across the country or around the world. While a single gateway GW1 20 is shown connected to PSTN 14a, this representation is for purposes of simplicity in establishing a session and transmitting a communication from caller device 10 through a typical gateway for access to the Internet 16. In an actual communications network, plural originating gateways would be connected to PSTN 14a as is shown for plural terminating gateways in relation to PSTN 14b, the actual number of gateways being related to the expected communication traffic and bandwidth utilization. Thus, gateways GW2 22, GW3 24 and GW4 26 are also representational.

A gateway device is fundamentally a computer, and thus is capable of performing numerous functions according to programming. Typically, a gateway is utilized to translate between two different types of networks, such as a telephone network and a packet switched data network.

A gatekeeper, for example GK 30, is charged with determining the best routing for connecting a particular call from a caller device to a callee device. A gatekeeper is an example of the intelligent node that determines routing information. For purposes of explanation herein, we use a gatekeeper system, although it is understood that the gatekeeper is not the only manner of implementing the intelligent node, and that any type of computer may serve the same function. Moreover, it is also possible that in some circumstances the intelligent node and the gateway may be built on the same hardware platform.

The determination of which routing is best, and on what basis, is the subject of various criteria, for example which route or which terminating gateway provides the lowest cost, the fastest connection speed, the highest transmission quality, bandwidth availability or preferential determination based on other factors. In the present invention, in initiating a communication session, by way of example, gateway GW1 20 is responsible for determining a preferred routing for a call initiated from caller device 10 and designated for remotely located callee device 12. As is shown, there is a plurality of possible gateways, GW2 22, GW3 24 and GW4 26, by which such a call may be routed. Initiating gateway GW1 20, either singly, or with input from gatekeeper GK 30, determines through which terminating gateway a specific call is to be routed, as will be described below. There may be a plurality of different endpoints at which a called party can be reached—a computer, a landline phone, a cell phone, a pager etc. and the current active one may be what is retrieved from the "GK" and cached by the caller or calling gateway.

A network such as is illustrated in FIG. 1 frequently includes a network operations center (NOC), the function of which is to provide instructions and modifications to various components of the network. NOC 32 is shown as connected to GK 30 so as to enable the provision of such instructions and modifications in addition to optionally communicating information designated gateways or other system components. Revised routing or other control criteria may be supplied to NOC 32 by a system operator through a GUI or be received and compiled by NOC 32 based on changes in time charges, connection speed, or other factors communicated directly from connected gateways. In one preferred embodiment described, NOC 32 is operative to modify routing criteria, or rules, by which GK 30 evaluates the selected terminating GW in response to a particular originating GW request for a communication session.

Figure 2:
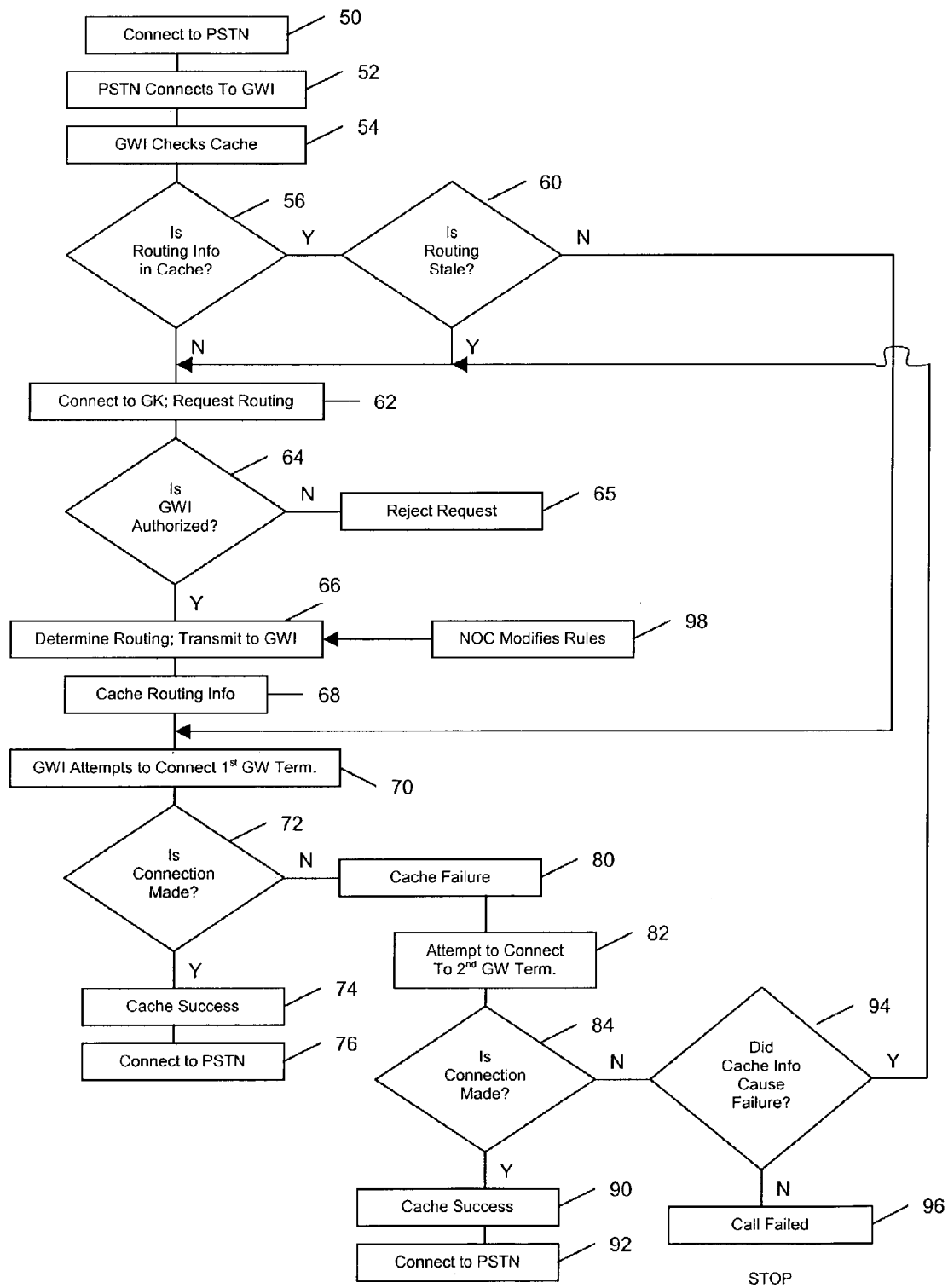
FIG. 2 is a flowchart showing the method by which the present invention generates routing to complete a call through a packet data network.

Referring now to FIG. 2, a description of the preferred method follows. Upon initiation of a call from caller device 10, a connection is established to PSTN 14a in step 50. In order to complete the communication session by way of the Internet, or other network, PSTN 14a establishes a connection to originating GW1 20 in step 52. GW1 20 is programmed to save previously used preferred routing and (optionally) a related authorization token in a cache (not shown). It is recognized that it is only useful to cache an authorization token if such token has use beyond the instant call request. Such a cache, or active memory device, may physically reside within GW1 20, at GK 30, or in another location, e.g. between GW1 20 and GK 30. Wherever a cache of previously used preferred routing is maintained, by originating GW1 20 accessing the cache as a first step, connection to GK 30 may be avoided. Additionally, GK 30 reviewing routing rules for a particular caller device is clearly avoided, GK 30 determining the appropriate routing for the particular caller device is clearly avoided, and GK 30 transmitting a routing decision to GW1 20 is also avoided. Bypassing these steps has the benefit of reducing the transaction time required for making a connection as well as reducing the amount of processing GK 30 is required to perform, thus preserving capacity. Further, the communication traffic on the system is reduced and the gatekeeper is caused to make fewer dips into databanks to access information.

GW1 20 checks the cache in step 54 and determines in step 56 whether the needed routing information is available for connecting a communication from caller device 10 to callee device 12. Typically, the primary identification of a callee is a telephone number, since the primary focus of the invention is voice communication. However, it is recognized that other indicia of a callee, for example a URL or even a name, is similarly usable. In addition to determining whether the preferred routing information is in the cache, GW1 20 also determines whether an authorization token exists and if the cached routing information and authorization token have been in the cache beyond its useful term, i.e. is stale, in step 60. Routing information may also be considered stale if the number of connections made since the information was established has exceeded a selected number. If the routing information is in the cache and is stale, or the routing information is not in the cache, or the routing information in cache does not succeed when utilized, a connection to GK 30 is made so as to request current routing information and authorization, in step 62. GK 30 determines from a database whether originating GW1 20 is an authorized user of the system in step 64. User authorization involves a pre-established relationship between GW1 20 and GK 30 as intermediary agent. If GW1 20 is not authorized, the request for routing is rejected in step 65.

If GW1 20 is authorized, GK 30 ascertains a prescribed one or more parameters of the call that are to be used to determine the routing. In a preferred embodiment, such parameters may include the called area code and one or more portions of the called telephone number. Additionally, parameters may also include the identity of the originating gateway, or any other desirable available information. GK 30 determines a preferred routing specific to a communication session between caller device 10 and callee device 12 to designate a specific terminating gateway in step 66, and GK 30 transmits the routing information to GW1 20, together with the criteria or characteristics upon which the routing was determined and an encrypted authorization token. The authorization token is coded, according to the preferred embodiment, with applicable limiting factors, e.g. that authorization applies only during certain hours, or for a prescribed number of calls, or until the end of a time period, or the authorization is considered stale. Upon receipt, in step 68, GW1 20 caches the routing information, token and basis criteria for future use, simultaneously overwriting any previously cached routing for this specific set of call criteria.

The transmitted routing information may be in the form of a list of one or more terminating gateways to use. It may also contain an ordered priority for the gateways, a list of gateways among which to divide traffic, or any other type of routing information required by the particular system in use.

According to an alternate embodiment, when GW1 20 receives a request from caller 10, GW1 20 immediately transmits a request to GK 30 for routing instructions. However, this routing request is automatically directed to a cache and a determination is made as to whether routing information and authorization already exist and are not stale. Optionally, the system may also decide based on one or more other criteria if the cached information is operable and/or desirable to use for the subject call. If so, the cache transmits the routing information directly to GW1 20 and deletes the request intended for GK 30. If no routing information is found in a cache, the request is forwarded on to GK 30. In either first or second embodiment, the routing request may be in the form of an SS7 query or other protocol.

As of receipt of routing information from GK 30, or alternatively as of a determination in step 60 that the available cached routing information is not stale, GW1 20 then initiates a connection to the recommended gateway, e.g. GW2 22, in step 70. GW1 20 then determines in step 72 whether the attempted connection succeeded. If the connection was made, the fact of a successful connection, useful for future routing determinations, is cached in step 74, and a connection to PSTN 14b is made in step 76. Thereupon the final link from PSTN 14b to callee device 12 is made and the communication proceeds. If the determination of step 72 is that the connection to GW2 22 failed, such failure is cached in step 80. Whereas when routing information is supplied from GK 30 to GW1 20 in step 64 above, if plural terminating gateways are available, a primary and one or more backup gateways are designated in the same routing information transmission. Therefore, following the failure of the first connection attempt, connection is attempted to a second recommended terminating gateway, e.g. GW3 24 in step 82. Again, GW1 20 determines if the connection has been successfully completed in step 84, with a successful connection result cached in step 90 followed by a connection to PSTN 14b in step 92. If it is determined in step 84 that the connection failed, a determination is made in step 94 whether the failure is because of incorrect or outdated information in the cache. If yes, the system reverts to step 62 to connect to GK 30 to request routing based on current information. If no, it is assumed that the failure is caused by the communication equipment and the call attempt is terminated in step 96. Decision 94 must have access to information indicating whether the routing information that has failed is from cache or from the gatekeeper. This information can be easily ascertained by simply setting a software indicator just prior to entering step 70 in FIG. 2, so that before the routing information is utilized, a record is maintained indicating whether it came from cache or from a remote location such as a gatekeeper.

An algorithm incorporated in the software of the present invention, rather than simply applying all connections to routing and a terminating gateway which appears to satisfy the established criteria, is provided to apportion to various routings according to a pattern. The criteria may be established so that primary status requires a cost within a selected percentage of the median time charge while providing better than 90% transmission quality. Whichever routing attains or comes closest to this guideline is allocated a major portion of connection traffic. However, since there may be occasions when the amount of incoming call traffic exceeds the available bandwidth of this routing, and since maintaining a viable market requires more than one option, a certain proportion of the traffic is to be allocated to a secondary, lower scoring, routing option.

GK 30 may, at various times or upon various happenings, proactively revise selection rules or call routings. For example, GK 30 may instruct one or all originating gateways to disregard previously cached routing guidelines. GK 30 may instruct an originating gateway to refresh or otherwise modify existing routing information, part of which modification may be based on a cached history of successful or unsuccessful connections.

NOC 32, as described briefly above, is included in the method of the present invention to provide to the network, specifically to GK 30, modified or new parameters for the determination of selected routing. In step 94, NOC 32 provides modified parameters or rules issued by GK 30 to evaluate the preferred routing for a specific communication session. In one embodiment, GK 30 installs the modified parameters in its memory in place of the previous parameters for use when requested. In a second embodiment, GK 30, in addition to installing the modified parameters, also creates and transmits to each affected originating gateway an instruction to delete previous routing information for those caller devices whose routing would potentially be changed. This step ensures that future connections benefit from updated information, resulting in optimum utilization of bandwidth and equipment.

Figure 3:
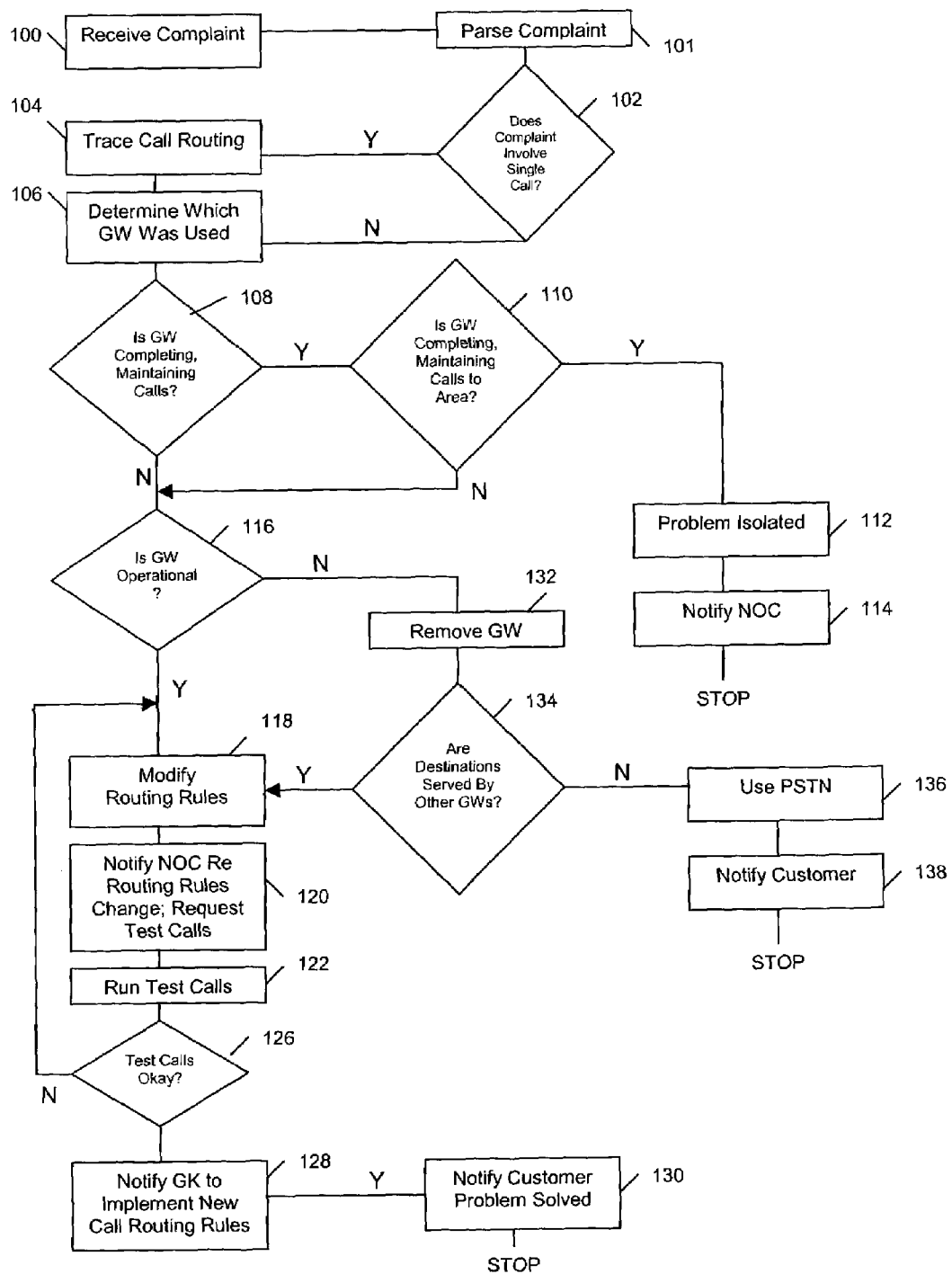
FIG. 3 is a flowchart showing the method by which the present invention modifies the rules by which call routing is generated on the basis of equipment failure.

Referring now to FIG. 3, a method flowchart is illustrated for analyzing and modifying the operations of the communication system in response to a complaint message received by the system controller at step 100 from a customer regarding telephone service. The complaint may relate to problems encountered in a specific call made, attempted, or received or may relate to a general service problem. A call complaint message may refer to any of a number of call attributes, including an uncompleted call, poor transmission quality, a service interruption in the middle of a call, or a general unexplained lack of incoming calls for a period of time. Upon receipt of such a complaint, in step 101 the system parses the complaint to determine its nature. In step 102, the system determines whether the complaint involves a single call or is more general. If the complaint involves a single call, the system traces the records containing information relating to the routing of the specific call in step 104, and determines in step 106 the specific terminating GW through which the call was unsuccessfully attempted or partially completed. If the step 102 determination indicates that the complaint is more general, the system moves to step 106 directly. Based on the determination of which terminating gateway was involved in the complaint, in step 108 the system analyzes pertinent data, including prior call records, SNMP traps, network alarms and call quality scores, through the same gateway so as to assess whether this GW is performing at or above established GW quality thresholds, based on average, minimum, maximum call completion, call duration and call quality score. The invention recognizes that connecting and then disconnecting a call within a very small time window is tantamount to not connecting the call at all, since the parties have insufficient time to have a meaningful interchange. Such a minimum time period may be, for example, 10 seconds, providing one is evaluating multiple calls, i.e. a single call at or less than 10 seconds may not indicate a problem, but the occurrence of multiple such short duration calls is likely to be the result of a malfunction.

As a further step in evaluating the reliability of the system in service, if it is determined in step 108 above that the identified terminating GW is performing at or above established GW quality thresholds for calls, a second stage analysis as to whether the GW has been completing and maintaining calls above the minimum time level to an identifiable geographic area, for example a specific city, is conducted in step 110. It will be understood that the minimum level of completed and maintained calls to a geographic area that is within the total area served by the GW is a narrower subset of the minimum level of calls to the total service area. Thus, the call completing determination of step 110 is a more focused investigation than the determination of step 108, providing a finer definition of an existing problem.

If the system determines in step 110 that the identified terminating GW is performing at or above the threshold with respect to calls to the target area, it is deemed that the call that was the motivation for the complaint received in step 100 above was the result of an isolated problem, not occurring in the majority of calls placed through the identified GW. At this determination, the system notifies the NOC (network operations center) in step 114 that the problem does not appear to have been systemic. The system then stops to await another service complaint.

However, if the response to the inquiry at either of steps 108 or 110 is in the negative, this indicates that the problem is somewhat widespread. At least calls attempted through the identified GW are failing at an unacceptable rate. The system then determines in step 116 if the involved GW is operational at even a minimal level. If not, the GW is removed from a database of active, available GWs in step 132 and a determination is made in step 134 whether additional GWs serve the destinations in question. If not, the system reverts to route calls to the PSTN in step 136 and notifies the customer in step 138. If the conclusion is affirmative to either step 116 or 134, the system institutes a modification in step 118 of the rules that have previously been used to control the call routing. The routing rules are predicated on call completion, call duration, transmission quality, connectivity speed and call unit cost. Therefore, in order to modify the call routing rules, the system will attempt to revise call routing for destinations that had been routed through the GW that was recently determined to be troublesome to another terminating GW. In other words, if the troublesome gateway is still operational, as determined in step 116, the GW is re-evaluated on the basis of the current information and ranked in comparison to other terminating GWs and the PSTN for service to the geographic area from which the complaint was received. Ranking allows the system to select the most appropriate GW for a given call based on an evaluation of overall operational performance. If the destination is not served by other GWs, the instruction to connect incoming calls via the PSTN is made at step 136. A notification is sent in step 138 to the customer that the problem is being corrected and that a temporary instruction routing calls through the PSTN has been implemented.

Upon re-ranking GWs or other routing rule modification being made at step 118, the NOC is notified of the development of new routing rules at step 120. The NOC has the ability to obtain detailed information regarding the revised routing rules from the system databank. The notification of step 120 also requests that the NOC or established programming initiate a series of test calls to simulate actual traffic to the designated destination in order to evaluate the efficacy of the revised routing rules. The test calls are run in step 122 and the results analyzed in step 126. If the results of the test calls are determined to be satisfactory in step 126, the gatekeeper responsible for establishing call routing for specific destinations is notified in step 128 to implement the new call routing rules after which the customer is notified in step 130 that the problem has been solved, and the system stops. If the results of the test calls in step 126 are not acceptable, the system either cycles back to step 118 to attempt a further modification of the routing rules or institutes the revised routing, depending on established settings. If further modification is preferred, the system runs the method steps 118 through 126 until approval is achieved.

While the present invention is described with respect to specific embodiments thereof, it is recognized that various modifications and variations may be made without departing from the scope and spirit of the invention, which is more clearly and precisely defined by reference to the claims appended hereto.

What is claimed is:

1. A method for modifying call routing in an internet telephony environment, comprising the steps of:
   (a) receiving a complaint message regarding telephone service;
   (b) analyzing call routing based upon the complaint message, said analyzing including determining what routing was used in response to the complaint message received;
   (c) modifying call routing rules;
   (d) transmitting the modified call routing rules to a NOC;
   (e) the NOC transmitting the modified call routing rules to selected gatekeepers; and
   (f) if the complaint message involved a specific call, determining through which gateway the specific call was attempted or completed by other completed calls.

2. The method for routing calls as described in claim 1, wherein if the gateway through which the specific call complained of was attempted or completed is completing and maintaining more than a selected level of other calls, concluding that the complaint call was an isolated incident.

3. The method for routing calls as described in claim 2, wherein if the gateway through which the specific call complained of was attempted or completed is not completing and maintaining more than a selected level of other calls, concluding that the complaint call was not an isolated incident.

4. A method for modifying call routing in an internet telephony environment, comprising the steps of:
  (a) receiving a complaint message regarding telephone service;
  (b) analyzing call routing based upon the complaint message, said analyzing including determining what routing was used in response to the complaint message received;
  (c) modifying call routing rules;
  (d) transmitting the modified call routing rules to a NOC; and
  (e) the NOC transmitting the modified call routing rules to selected gatekeepers;
  (f) if the complaint message did not involve a specific call, determining which gateway usually would service an area from which the complaint was received.

5. The method for routing calls as described in claim 4, further comprising the step of determining whether the gateway is completing and maintaining other calls.

6. The method for routing calls as described in claim 5, wherein if the gateway complained of is completing and maintaining more than a selected level of other calls, concluding that the complaint call was an isolated incident.

7. The method for routing calls as described in claim 5, wherein upon determining that the complaint was not an isolated one, revising the rules to route future calls to the destination area from which the complaint was received through a different route.

8. The method for routing calls as described in claim 7, further comprising determining whether the gateway is operational.

9. The method for routing calls as described in claim 8, wherein if it is determined that the gateway is not operational, further comprising removing the non-operational gateway from availably for routing further calls.

10. The method for routing calls as described in claim 9, further comprising determining whether destinations served by the non-operational gateway are served by other gateways.

11. The method for routing calls as described in claim 10, wherein if it is determined that no other gateway provides service to destinations served by the non-operational gateway, routing future calls to a PSTN.

12. The method for routing calls as described in claim 10, wherein if it is determined that another gateway serves destinations served by the non-operational gateway, routing future calls to another such gateway.

13. A method for routing calls in a network telephony environment, comprising the steps of:
  (a) disregarding previously cached routing guidelines;
  (b) establishing modified routing guidelines; and
  (c) caching the modified routing guidelines;
  (d) conducting test calls to determine whether the modified call routing guidelines improve the ratio of successful connections to unsuccessful connections.

14. The method of claim 13, further comprising basing the modified routing guidelines on a history of successful or unsuccessful connections.

15. The method of claim 13, wherein the step of establishing modified routing guidelines comprises designating a different receiving gateway than a previously designated receiving gateway for transmitting a call to a designated destination.

16. The method of claim 13, wherein the method steps are initiated periodically.

17. The method of claim 13, wherein the method steps are initiated upon the happening of a specified event.

18. A method for routing calls in a network telephony environment, comprising the steps of:
  (a) disregarding previously cached routing guidelines;
  (b) establishing modified routing guidelines; and
  (c) caching the modified routing guidelines;
  wherein the method steps are initiated upon the happening of a specified event, and the event comprises the ratio of successful calls to unsuccessful calls falling below a selected level.

19. A method for routing calls in a network telephony environment, comprising the steps of:
  (a) a gatekeeper instructing at least one originating gateway to disregard previously cached routing guidelines;
  (b) the gatekeeper establishing modified routing guidelines;
  (c) the gatekeeper transmitting the modified routing guidelines to the at least one originating gateway; and
  (d) the at least one originating gateway receiving and caching the transmitted modified routing guidelines;
  (e) conducting test calls to determine whether the modified call routing guidelines improve the ratio of successful connections to unsuccessful connections.

20. The method of claim 19, further comprising basing the modified routing guidelines on a cached history of successful or unsuccessful connections.

21. The method of claim 19, wherein the step of establishing modified routing guidelines comprises designating a different receiving gateway than a previously designated receiving gateway for transmitting a call to a designated destination.

22. The method of claim 19, wherein the method steps are initiated periodically.

23. The method of claim 19, wherein the method steps are initiated upon the happening of a specified event.

24. A method for routing calls in a network telephony environment, comprising the steps of:
  (a) a gatekeeper instructing at least one originating gateway to disregard previously cached routing guidelines;
  (b) the gatekeeper establishing modified routing guidelines;
  (c) the gatekeeper transmitting the modified routing guidelines to the at least one originating gateway; and
  (d) the at least one originating gateway receiving and caching the transmitted modified routing guidelines;
  wherein the method steps are initiated upon the happening of a specified event, and the event comprises the ratio of successful calls to unsuccessful calls falling below a selected level.

* * * * *